United States Patent Office 3,309,435
Patented Mar. 14, 1967

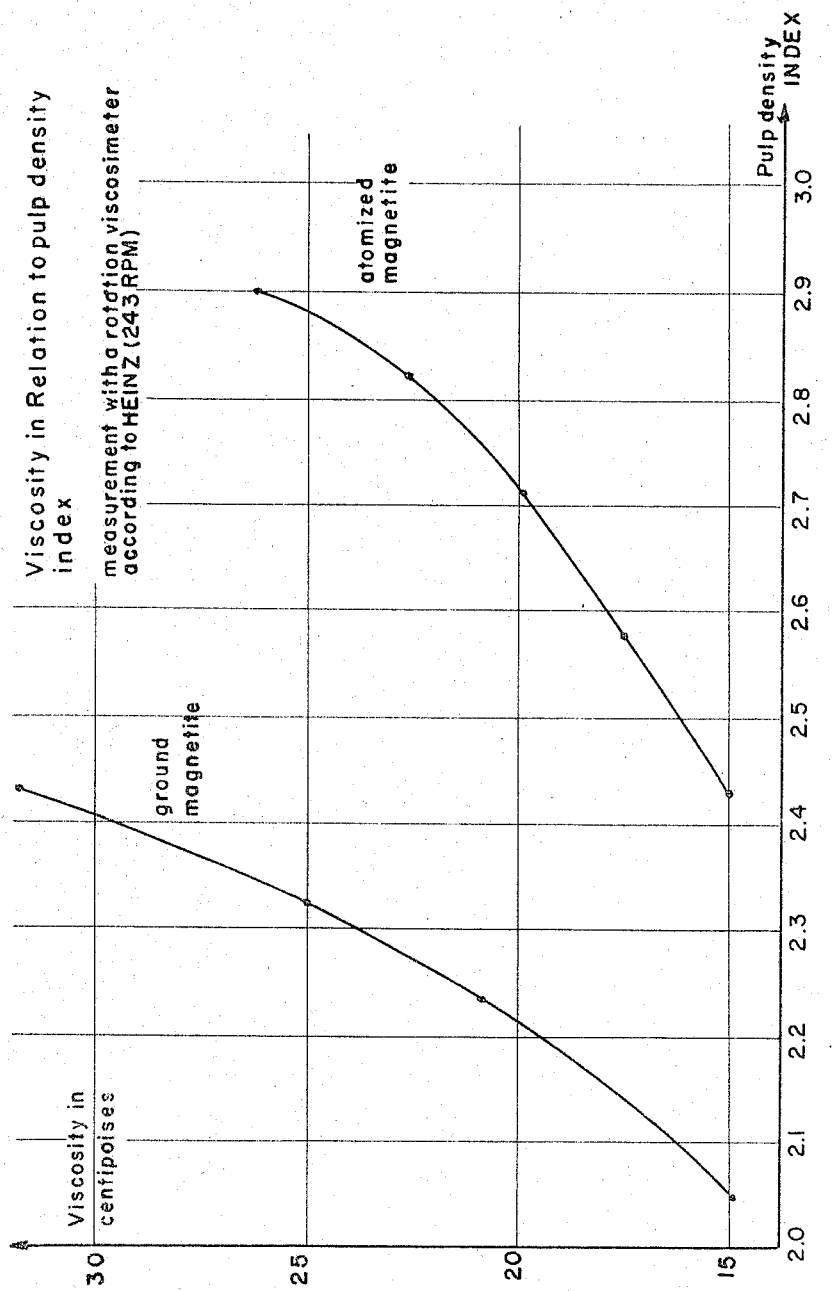

3,309,435
PROCESS FOR THE MANUFACTURE OF ROUNDED POWDERED MAGNETITE PARTICLES
Klaus Feldmann, Hermulheim, near Cologne, Heinz Harnisch, Lovenich, near Cologne, Joachim Kandler, Bruhl, near Cologne, and Wilfried Gerhardt, Knapsack, near Cologne, Germany, assignors to Knapsack-Griesheim Aktiengesellschaft, Knapsack, near Cologne, Germany, a corporation of Germany
Filed Nov. 17, 1964, Ser. No. 411,927
Claims priority, application Germany, Nov. 18, 1963, K 51,396
6 Claims. (Cl. 264—12)

The present invention is concerned with a process for making powdered magnetite consisting of particles having a smooth and spherical surface area.

Molten metals or metal alloys, e.g. ferrosilicon, can be transformed by being atomized into pulverulent particles having a smooth and spherical surface area, but metal oxides could not be so atomized heretofore.

The present invention now provides a process which unexpectedly enables metal oxides, e.g. magnetite, to be atomized from a corresponding melt with a gaseous or vaporous medium serving as the atomizing agent, the atomization resulting in particles having a smooth and spherical surface area, which are obtained on allowing the atomized melt to solidify.

In this process, smooth and spherically shaped particles could not be expected to form for the reason that irregular or edged particles or silicate wool will be obtained on granulating a silicate melt and crystals are obtained on atomizing an alumina melt. Furthermore, it has been experienced in foundry practice that magnetite readily undergoes cracking on cooling the melt. It has now unexpectedly been found that magnetite atomized in accordance with the process of the present invention will be obtained in the form of particles having an almost spherical shape rather than in the form of cracked particles.

In accordance with the present invention the powdered magnetite consisting of particles having a smooth and spherical surface area is prepared by causing a corresponding melt to solidify or more especially by spraying and atomizing molten magnetite. The magnetite melt prepared e.g. by electrothermal means is advantageously atomized with water, steam, air, nitrogen or the like serving as the atomizing agent under a pressure within the range of about 2 to 13, preferably 12 to 13 atmospheres, the magnetite melt having a temperature varying between melting temperature and 1800° C., advantageously 1600 to 1800° C. Pure magnetite ($Fe_3O_4$) melts at a temperature of 1538° C. but often at a lower temperature, e.g. at about 1200° C., due to included impurities.

Solid magnetite particles first prepared in conventional manner by grinding can successively be caused, if desired under pressure and with the aid of an atomizing agent, to flow through a heating zone, e.g. a flame zone, the particles being melted round at least superficially on passing through that zone and being allowed to solidify in a cooling or quenching zone following the heating zone. The rounded-off magnetite particles are most frequently obtained in the form of grains having a spherical, droplike or elongated shape, the size of the atomized particles being a function of the pressure of the water vapor applied during the atomizing step. For example, approximately 65% of the spherical magnetite will be obtained in the form of particles having a diameter of less than 0.15 mm. under the pressure of the water vapor of 3.5 atmospheres, and an at least 80% proportion thereof will be obtained under a pressure of 12 atmospheres.

The magnetite atomized in accordance with the present invention is magnetite of the type wherein the principal magnetite constituent corresponds to the general formula $Fe_3O_{3.1}$—$Fe_3O_{4.1}$ which can be alloyed selectively with metallic iron or iron-III-oxide so as to modify the oxygen content thereof. Very pure magnetite ($Fe_3O_4$) contains 71.4% Fe and has a density of 5.15 gram/cc. but the iron content is often considerably lower due to isomorphous admixture of Mg or Mn (less frequently Al, Ti, V).

The concentrate which is obtained on the conventional dressing of natural magnetite and which contains e.g. 0.1 to 7.0% by weight $SiO_2$, 0.2 to 1.2% by weight $Al_2O_3$, 1 to 6% by weight CaO, and 0.5 to 1.5% by weight MgO is generally used in the atomization process of the present invention with no or only slight modifications of the above composition being involved. Analysis indicated that the atomized magnetite contained, e.g. 4.2% by weight $SiO_2$, 0.55% by weight $Al_2O_3$, and 1.0% by weight CaO.

Due to its almost ideal spherical shape the atomized magnetite is very suitable for use in the preparation of heavy pulps for the float-sink dressing of ores, minerals and coal. It is old to use spherical-shaped and more especially ground magnetite in the float-sink dressing, but the spherical magnetite used heretofore had been magnetite of the type contained in the flue dust resulting from the combustion of coal. However, flue dust is always a waste or by-product of coal combustion and its composition is a function of the coal contaminants. In other words, a powder varying in density will be obtained. The $SiO_2$— content of various screen fractions of the flue dust varies between 7.00 to 42.52%. The iron content is also low; this fact and the high proportion of light weight components ($SiO_2$, $Al_2O_3$, CaO, MgO and others) are responsible for the low density index of the product e.g. of 4.39 which interferes with its use as a heavy pulp agent. As opposed thereto, powders of any desired density can be produced by atomization while incorporating metallic iron or iron-III-oxide therewith.

Heavy substances of spherical shape subject the single particles to lesser friction and thus produce heavy pulps having a viscosity smaller than that of heavy pulps made with heavy substances consisting of ground and edged particles.

A spherical-shaped heavy substance permits suspending a higher proportion of solid matter. This results in the formation of a suspension having a density higher than a suspension prepared with ground powder without the consistency (viscosity) of the heavy pulp being increased. As compared with ground magnetite spherical-shaped magnetite offers two advantages:

(1) Higher pulp density for identical pulp viscosity.
(2) Lower pulp viscosity for identical pulp density.

The viscosity of an atomized magnetite (for preparation and screen analysis see Example 2 below) was measured in a rotary viscometer. The pulp was circulated during the measurement so as to prevent the heavy substance from depositing. The results obtained are indicated in the following table and graphically plotted on the accompanying diagram. A comparative measurement was made with ground magnetite of identical screen analysis.

| Atomized magnetite | | Ground magnetite | |
|---|---|---|---|
| Viscosity, centipoises | Pulp density index | Viscosity, centipoises | Pulp density index |
| 15.0 | 2.43 | 14.9 | 2.05 |
| 17.5 | 2.58 | 17.7 | 2.17 |
| 19.9 | 2.71 | 20.8 | 2.23 |
| 22.5 | 2.82 | 25.0 | 2.33 |
| 26.3 | 2.90 | 31.7 | 2.43 |

The measurement was made at a speed of 243 r.p.m.

About 25 centipoises constitute the limit of viscosity for a heavy pulp to ensure good separation. The table indicates that ground magnetite enables a pulp density index of about 2.3 to be obtained as against a pulp density index of more than 2.8 obtainable with atomized magnetite (pulp density index=relative weight=weight of substance:weight of a volume-identical amount of water at 4° C.). The pulp density indexes obtainable in permanent operation have been experienced to be 0.1 to 0.2 lower than the indexes measured under laboratory conditions with the pure media (without sludge). Ground magnetite enables a plup density index of about 2.2 to be obtained under practice conditions. Atomized magnetite permits maintaining a plup density index of 2.7. The pulp can be regenerated with the use of a magnetic drum separator since atomized magnetite has been found to be completely magnetic. This means complete coverage of the range within which a mixture of ferrosilicon with magnetite rather than a heavy substance alone had to be used heretofore. Ferrosilicon alone can be used for pulp density indexes above 2.7.

The smooth and spherical-shaped magnetite powder prepared in accordance with the present invention can also be used with advantage for applications other than float-sink dressing. It can be used, for example, to serve as a loading agent or filler material. The high stamp density of the powder of up to 3.2 to 3.4 gram/cc. obtainable due to the spherical-shaped particles is especially advantageous for these applications. Such stamp density corresponds to a material occupying a given volume to an extent of about 65 to 70%. Ground powders, however, will always occupy less than 55 to 60% of a given volume, which means that the stamp density is accordingly lower. The term "stamp density" as used herein is understood to mean the density obtained after prolonged stamping or vibrating treatment.

Magnetite powder consisting of smooth and spherical-shaped particles can also be used as a constituent in sheathing compositions for making compression-jacketed welding electrodes. For sheathing ore-acid electrodes, more oxidized or more reduced atomized magnetite can be substituted for ground magnetite. In this case, less binding agent (water glass) is required due to the smooth and spherical shape of the single particles. The mixture will be more homogeneous because the single particles will not cohere together and therefore can be mixed in satisfactory manner.

*Example 1*

500 kg. magnetite were melted in a tiltable electric furnace and superheated at 1700° C. With the aid of a pouring gate the magnetite melt was poured in jets 8 mm. thick through the center aperture of an annular slit nozzle issuing a steam jet under a pressure of 12 atmospheres. The atomized magnetite was quenched with water and successively dried. Chemical analysis indicated that the magnetite contained:

| | Percent |
|---|---|
| $SiO_2$ | 5.2 |
| CaO | 0.9 |
| $Al_2O_3$ | 0.66 |
| MgO | 0.15 |

*Example 2*

450 kg. magnetite and 50 kg. iron were atomized in the manner set forth in Example 1. Chemical analysis indicated:

| | Percent |
|---|---|
| $SiO_2$ | 4.7 |
| CaO | 0.6 |
| $Al_2O_3$ | 0.45 |
| MgO | <0.10 |

The atomized magnetite had a pycnometer density of 5.06 gram/cc. The degree of grain size distribution was as follows:

| Mm. | Percent |
|---|---|
| >0.25 | 4.7 |
| 0.25–0.20 | 5.1 |
| 0.20–0.15 | 8.3 |
| 0.15–0.10 | 15.6 |
| 0.10–0.05 | 31.6 |
| <0.05 | 34.7 |

We claim:

1. A process for the manufacture of smooth rounded powdered magnetite particles which comprises spraying and atomizing molten magnetite having a temperature ranging from about 1200 to 1800° C. under a pressure ranging from about 2 to 13 atmospheres using a substance selected from the group consisting of water, steam, air and nitrogen as the atomizing agent.

2. A process as claimed in claim 1, wherein molten magnetite prepared by electrothermal means is atomized.

3. A process as claimed in claim 1, wherein the magnetite atomized is magnetite of the type wherein the principal magnetite constituent corresponds to the general formula $Fe_3O_{3.1}$—$Fe_3O_{4.1}$.

4. A process as claimed in claim 3, wherein the molten magnetite is admixed with a substance selected from the group consisting of metallic iron and iron-III-oxide which serve to adjust a given oxygen content in the molten magnetite.

5. A process as claimed in claim 3, wherein magnetite of natural origin is dressed in conventional manner and the resulting magnetite concentrate containing about 0.1 to 7.0% by weight $SiO_2$, 0.2 to 1.2% by weight $Al_2O_3$, 1 to 6% by weight CaO, and 0.5 to 1.5% by weight MgO as contaminants is atomized.

6. A process as claimed in claim 1, wherein the molten magnetite is atomized under a vapor pressure of 12 atmospheres with the resultant formation of magnetite particles of which at least an 80% proportion has a grain size diameter smaller than 0.15 mm.

References Cited by the Examiner

UNITED STATES PATENTS

| 1,894,208 | 1/1933 | Girsewald et al. | 264—12 |
| 2,878,518 | 3/1959 | Klee | 264—12 |

ROBERT F. WHITE, *Primary Examiner.*

ALEXANDER H. BRODMERKEL, *Examiner.*

J. R. HALL, *Assistant Examiner.*